United States Patent [19]
Norville

[11] Patent Number: 5,334,335
[45] Date of Patent: Aug. 2, 1994

[54] COMPOSITIONS AND METHODS FOR REPAIRING AND REMOVING SCRATCHES AND OTHER IMPERFECTIONS FROM PLASTIC SURFACES

[75] Inventor: William C. Norville, Park City, Utah

[73] Assignee: Clearfix Corporation, New York, N.Y.

[21] Appl. No.: 962,887

[22] Filed: Oct. 19, 1992

[51] Int. Cl.$^5$ .................. B24D 3/02; B29C 59/00; B32B 35/00; C09C 1/68
[52] U.S. Cl. ........................ 264/36; 51/308; 51/309; 264/293; 264/341
[58] Field of Search ............ 264/36, 162, 293, 341; 51/308, 309

[56] References Cited

U.S. PATENT DOCUMENTS

| | | |
|---|---|---|
| 2,921,839 | 1/1960 | Ritter . |
| 3,446,890 | 5/1969 | Emery et al. ............ 264/341 |
| 3,663,255 | 5/1972 | Vivian ................ 264/341 X |
| 3,684,553 | 8/1972 | Van Dyk .............. 264/341 |
| 3,729,331 | 4/1973 | Vivian ................ 264/341 X |
| 3,737,499 | 6/1973 | Kamena ............... 264/341 X |
| 3,807,054 | 4/1974 | Joseph et al. ......... 264/341 X |
| 3,904,732 | 9/1975 | Wick et al. ........... 264/341 |
| 3,933,518 | 1/1976 | Vivian ................ 264/341 X |
| 4,181,633 | 1/1980 | Colodney et al. . |
| 4,231,827 | 11/1980 | Wilson et al. ......... 264/293 X |
| 4,247,580 | 1/1981 | Chao .................. 264/36 X |
| 4,301,193 | 11/1981 | Zuk ................... 427/140 |
| 4,361,527 | 11/1982 | Rau ................... 264/293 X |
| 4,544,578 | 10/1985 | Duane, Jr. ............ 264/341 X |
| 4,952,240 | 8/1990 | Smith ................. 51/309 X |
| 4,956,015 | 9/1990 | Okajima et al. ....... 51/308 X |
| 5,007,128 | 4/1991 | Englund et al. . |
| 5,137,541 | 8/1992 | Foster ................ 51/308 X |

Primary Examiner—Karen Aftergut
Attorney, Agent, or Firm—Workman, Nydegger & Jensen

[57] ABSTRACT

Polishing compositions and methods are provided for removing scratches and other imperfections from a variety of plastic surfaces in order to improve clarity and optical quality. Such polishing compositions include a solid polishing material, water, and an organic solvent containing undecane or any equivalent solvent. They can also include a stabilizing agent such as carnauba wax to keep the other ingredients suspended or otherwise mixed together. The polishing compositions are applied using buffing pads made from a variety of materials, including open-cell polyurethane, fleece wool, cotton, or synthetic materials. The compositions are applied by hand or using a hand-held rotary, orbital, or oscillating buffing machine, and are also compatible with existing scratch removal machines, such as robotic machines used to restore airplane windows.

40 Claims, No Drawings

COMPOSITIONS AND METHODS FOR REPAIRING AND REMOVING SCRATCHES AND OTHER IMPERFECTIONS FROM PLASTIC SURFACES

BACKGROUND

1. The Field of the Invention

The present invention relates to compounds and methods for removing scratches and other imperfections in the surface of plastics. More particularly, the present invention is directed to compounds, and methods for using the same, which can remove scratches and other defects from the surface of plastics in order to improve the optical quality of the plastic in the situation where plastics have become scratched, or otherwise opaque or semi-opaque because of physical, chemical or light damage.

2. Review of the Prior Art

In recent years, plastics have been used increasingly in place of glass as a cover or surface of choice for many applications such as watch faces, windows and table surfaces. The advantage of using plastic is that it is more lightweight, less brittle, stronger, and far less likely to break than glass. However, one of the drawbacks of using plastic is that its surface is not nearly as hard as glass. Consequently, it is much more prone to being scratched by hard objects or debris, such as metal, glass, sand, grit, or any other abrasive material.

In addition, plastics are more prone to hazing or surface yellowing due to weathering, which is often caused by oxidation or the influence of ultra-violet light from the sun. Such discoloration also can occur through ordinary cleaning of the plastic surfaces. Not surprisingly, while the surface of glass might remain clear for many years, plastic often becomes clouded, yellowed or otherwise opaque through oxidation and by other corrosive forces found in nature.

Plastic is the material of choice for making motorcycle windshields and airplane or jet windows, all of which must withstand high wind forces and pressure differentials. However, due to such high speed winds, damage to the windshields and windows is even more likely.

Of particular concern is in the field of aviation and more particularly, in the area of airplane windows. Anyone who has ever flown in an aircraft, large or small, either as a passenger or a pilot, has undoubtedly noticed that the windows are often scratched, yellowed, or otherwise partially opaque. Besides being merely bothersome to the passenger, such damage can also severely impair the ability of the pilot to see the landscape outside the plane, creating a danger to all aboard. However, the discomfort and negative feeling such window damage can cause to passengers should not be overlooked.

Four airline companies, American Airlines, Delta Airlines, United Airlines and Sky West Airlines, conducted a customer survey and found that the customers' single greatest complaint concerned damage to the planes' windows, and more specifically, that the windows were so scratched that the customers could hardly see through them much of the time. The survey showed that some of the customers surveyed drew a psychological correlation between the poor condition of the windows and the level of maintenance of the rest of the plane. Another specific and related complaint involved customers who wished to take photographs of the scenery below through the windows, but who were unable to do so due to the poor condition of the windows.

While the scratched windows pose no real safety risk to the airline passengers, customer satisfaction and enjoyment is key to any business venture including that of common carriers like airlines.

In addition to commercial aircraft (of which there are some 13,000 in the United States alone) there are approximately 250,000 private planes in the United States and approximately 15,000 helicopters. Although the price of replacing the windows of these aircraft may vary according to the size, shape and materials in the window, it costs approximately $75,000 to completely replace the windows of a typical Lear 25-D jet.

In the military arena, where clarity of vision is a top priority, there are tens of thousands of aircraft. In the Gulf War alone there were 1,700 U.S. military planes in action, which undoubtedly experienced window damage as a result of the high speed, low level flying in the sandy conditions of the Arabian deserts, or when simply sitting on the runway and being exposed to blowing sand. The cost to replace the canopies of various military fighter planes and bombers is in the neighborhood of between about $20,000 to about $80,000 per aircraft.

Currently, technology exists to remedy the problem of scratching, hazing, and oxidation of plastic surfaces, particularly aircraft windows, but it is prohibitively expensive, requiring large amounts of both capital and labor. The current best method of scratch removal involves the use of a robotic polishing machine, a machine which typically ranges in cost from $500,000 to $1,500,000. Another drawback, in addition to the cost of initial investment, is that this machine can only polish the windows after they have been removed from the plane, which is a very time-consuming and labor-intensive process. It also usually requires the removal of a few thousandths of an inch of the window surface to adequately remove the deeper scratches. Often, much of the plane's interior must be disassembled. Yet another factor is that the machine can only polish four windows per hour, and it requires two employees to operate. In addition to the high costs of both machine and labor, there is also the cost of the chemicals and other materials required to effectuate the window polishing.

Another cost which must be considered is the "down time" required to pull the entire aircraft apart in order to remove the windows, polish them, and then reassemble them into the aircraft. Most commercial aircraft have more than 150 windows, and it is not uncommon to take from between six and eight days to completely polish every window of each plane. Consequently, most airlines have chosen to forego this process as evidenced by the generally poor condition of commercial airline windows.

In addition to the expensive robotic polishing machine method set forth above, another sanding system called Micro-Mesh TM has been used to remove the scratches of plastics. The Micro-Mesh TM sanding system (a product of Micro-Surface Finishing Products, Inc. of Wilton, Iowa) uses a series of rubber-backed sanding cloths with differing sizes of grit. The first step uses a sanding cloth having 2,400 gauge grit. In subsequent steps, sanding clothes of finer grade up to 12,000 gauge grit are used. In addition to using the rubber sanding block, a small amount of anti-static cream is applied.

The drawbacks of using the Micro-Mesh TM system, as well as the robotic system as presently used, is that a large amount of plastic must be sanded away in order to remove even the tiniest of scratches. In addition, a sizable area of plastic must be removed in order to avoid causing optical distortion in the plastic in the surrounding area where the scratch is removed. Another problem of the Micro-Mesh TM sanding system is the large amount of time it takes to perform each of the series of sandings for each type of grit.

What these two systems (robotic polishing and Micro-Mesh TM sanding) have in common is that in order to remove a scratch from the surface of the plastic, it is necessary to remove enough of the plastic surface to at least equal the depth of the scratch, and in most cases even more. To avoid optical distortion, the person performing the scratch-removing operation must possess a high level of skill and patience, which requires a high amount of training. Moreover, repeated scratch removals using these systems will greatly reduce the thickness of the plastic and destroy its desired protective properties.

The Air Force has reported that because many windshields are manufactured to meet strict optics requirements, any removal of plastic or acrylic material during scratch removal can alter their optical qualities. In such cases, present scratch removal systems are essentially useless because in curing one problem (scratches) they create another (optical distortion).

In addition to airplane windows, there are hundreds of other applications which require clear, highly visual plastics, but where good visibility is often hindered because of scratches, oxidation and other opaqueness due to environmental influences. For example, schools around the country are switching from glass windows to windows made of Lexan TM, a product of General Electric Corp., in order to make them vandal-proof. Transit districts and schools around the country are switching from glass to plastic windows in their buses for the same reasons. In addition, new federal mandates now require trains to change all of their windows to plastic in order to make them more safe. Motorcycle windows are typically made of plexiglass, which is not glass at all, but a type of polymeric plastic. Watch "crystals" are often made of plastic and must be replaced when scratched. Finally, ski enthusiasts are often disappointed when their gondola is badly hazed or scratched, preventing the full breath-taking view they come to expect.

From the foregoing, it will be understood that what are needed are new compounds and methods for removing scratching, hazing and discoloration of plastic surfaces due to oxidation, which can be easily used and which do not require expensive machinery to apply. Further, it will be appreciated that it would be a significant advancement in the art if such compounds and methods were relatively inexpensive and could be applied by the average lay person.

In addition, it would be a significant improvement over the prior art to provide compounds and methods which could remove scratches in the surface of plastics without requiring the removal of the surrounding plastic surface in an amount equal to the depth of the scratch. It will be understood that it would be a significant advancement if such compounds and methods could rework the plastic surface to effectively "fill in" the plastic scratches, thereby obviating the need to remove large areas of the plastic surface to fully remove the scratch, and thus preventing optical distortion.

Finally, it will be appreciated that these alternative compounds and methods would be extremely useful if they could remove scratches, hazing and discoloration of aircraft windows without having to remove the windows from the plane.

Such compounds and methods are disclosed and claimed herein.

BRIEF SUMMARY OF THE INVENTION

The present invention encompasses novel compositions and methods for removing scratches and other imperfections in the surface of plastics such as hazing or yellowing. It has been found that such imperfections or flaws in the surface of the plastic can be removed by applying to the plastic surface renewal compounds described herein, which generally comprise a polishing grit suspended in a solution of water and organic solvents. In addition, carnauba wax can be added to stabilize and keep the mixture in suspension. The solvent comprises mainly undecane or its equivalents, while the polishing grit usually comprises one or more of the following: kaolinitic quartz, calcined alumina, silicon dioxide, borosilicate, and zirconium dioxide. The main constraint with regard to the polishing grit is the size of the particles, which can range anywhere between 0.5 microns to 500 microns depending on the plastic surface being treated. Larger scratches and imperfections generally require a larger size polishing grit.

The polishing compounds according to the present invention can be applied the same way as any polishing compound, although the results are far superior to any of the prior art compounds presently available. The presently preferred method of application for removing scratches from airplane windows is to apply the polishing compounds by means of conventional hand-held buffing or polishing machines, such as rotary, orbital, or oscillating polishing machines, using an open-cell polyurethane buffing pad. For lighter scratches as in watch crystals or compact discs, it is preferable to simply apply the compounds with a soft cotton cloth using a side-to-side, rather than a circular, motion. Finally, although it is certainly not necessary to use expensive robotic machines to achieve the best results, the compounds of the present invention are compatible with existing polishing systems presently used to clean aircraft windows (like robotic systems) but yield better results.

It should be understood that almost any type of buffing cloth will work with the compounds of the present invention including the aforementioned open-cell polyurethane material and cotton pads. Fleece wool, linen, rigid polyurethane, glass wool, and most other natural and synthetic materials work well. The only restraints are that the buffing pad be sufficiently durable to withstand the mechanical forces of the buffing process, that its stiffness be commensurate with the difficulty of the job in question, and that its component materials not be so hard that they will scratch the plastic surface.

The polishing compounds according to the present invention are effective in removing scratches from plastic surfaces without having to remove much of the plastic surface, if any. It is currently theorized that these compounds are able to reform the surface of the plastic and actually fill in the void or trough left by the scratch. Although a detailed analysis of this surface reformation process has not yet been performed, it is believed that the solvent within the polishing compound softens the raised edges of the scratch, while the localized heat generated by the polishing process reworks the plastic into the scratch. This obviates the need to remove large amounts of the plastic surface to effectively remove the void in the surface.

In some cases, where there are larger scratches, a polishing compound with a larger mesh size of polishing grit is used during a first step. Thereafter, polishing compounds containing successively smaller polishing grits are applied thereafter to yield a perfectly clear plastic surface. The buffing pad can be made from open-cell polyurethane, or any other appropriate material depending on the surface being treated. The main criterion is that the rigidity or durability of the pad be proportionate to the magnitude of the scratches and imperfections.

For smaller scratches, polishing compounds which contain finer gauge polishing grit are used initially, requiring fewer successive steps. Finally, for very fine scratches, hazing or surface yellowing, it is typical to use polishes with very fine polishing grits in only one or two steps. In addition, it is usually preferable to apply these finer grit compounds with softer buffing pads or cloths.

One solvent that has been found to work well is undecane, although other alkanes of similar molecular structure such as heptane, octane, nofiane, decane, dodecane, tridecane, tetradecane, and pentadecane would also work well. Earlier formulations contained a wide variety of different solvents, including many alkanes similar in structure and carbon content to undecane. It should be understood that terms such as "undecane" not only include the "normal," or straight-chained, isomer but also any branched molecule that has the same number of carbon atoms. Such terms also include any unsaturated or substituted derivatives that have equivalent properties.

The polishing grits in the polishing compounds preferably comprise kaolinitic quartz, silicon dioxide, calcined alumina, borosilicate, zirconium dioxide, magnesium oxide, magnesia buffered zinc oxide, or mixtures thereof. These polishing grits are purposely added in varying sizes depending on the type of plastic surface defect to be treated.

After the compounds of the present invention have restored the plastic surface, any residual compound is removed by wiping with a clean cloth. For areas where large amounts of polish have built up, such as in corners, excess polish can be removed by using a damp cloth, or by spraying the surface with water and then wiping with a clean, dry cloth. However, using solvents of any kind for this purpose should be avoided since many solvents can react with and haze the plastic surface, thus reversing whatever benefit was obtained by using the surface renewal compounds.

From the foregoing, it will be appreciated that an object of the present invention is the development of polishing compounds and methods for removing scratches, hazing, and discoloring of plastic surfaces which can be easily used or employed by lay individuals without having to be trained to use complicated equipment and machinery. It will also be appreciated that the compounds of the present invention can be used by ordinary people for any of a variety of plastic surface restoration projects at a low cost and with a minimum of effort compared to any of the commercially available prior art methods.

Further, another object and feature of the present invention is the development of novel polishing compounds and methods which can remove scratches in plastic surfaces without also requiring the removal of the surrounding plastic surface in an amount equal to the depth of the scratch. Further, such compounds and methods are able to rework the plastic surface, thus effectively filling in the plastic scratches, obviating the need to remove large amounts of the plastic surface, and thereby preventing optical distortion.

Yet another object and feature of the present invention is the ability for a technician to remove scratches, hazing and discoloration of aircraft windows without first having to remove them from the plane.

These and other objects of the present invention will become more fully apparent from the following description and appended claims, or may be learned by the practice of the invention.

DETAILED DESCRIPTION OF THE PREFERRED EMBODIMENTS

The present invention relates to novel polishing compounds and methods for removing scratches, hazing, yellowing, and other imperfections from plastic surfaces. The polishing compounds preferably contain polishing grit, water, and one or more organic solvents. The polishing compounds can also contain a stabilizing agent, such as carnauba wax, which helps to keep the constituent parts of the polish mixed together or in suspension. In addition, depending on the application for which the invention is used, the polishing compounds preferably contain varying sizes of polishing grit, which is suspended in the water and organic solvent mixture.

The polishing compounds are preferably applied using a conventional hand-held buffing or polishing machine, such as a rotary, orbital, or oscillating polishing machine, and an appropriate buffing pad. For airplane windows and other heavier duty applications, the pad of choice is polyurethane, although any other material of similar durability and consistency would work well. For finer scratches on smaller plastic surfaces, such as watch faces or compact discs, the compounds containing finer polishing grits are preferably applied by hand using a soft cotton or fleece wool cloth. The rigidity and durability of the polishing cloth is usually proportional to the level of damage to the plastic surface in question, as is the particle size within the polishing compounds.

More badly damaged plastic surfaces generally require the use of polishing compounds that have larger sized grit particles. Thereafter, in order to restore the plastic surface to a finer finish, it is often preferable to apply polishes containing successively smaller sized polishing grits.

Although ordinary buffing or polishing machines, such as hand-held rotary buffing machines, yield superior results, the compounds of the present invention are also compatible with any of the expensive robotic polishing systems presently employed in the airline industry. The difference is that the polishing compounds of the present invention yield superior results.

Because it is believed that the compounds according to the present invention succeed in actually reforming the plastic surface to which it is applied, it is unnecessary to remove or otherwise strip off a large layer of plastic in order to effectively remove the scratch. Instead, the compounds according to the present invention appear to soften the plastic lying on the surface and work it into the void in the plastic surface caused by the scratch being remedied. It is theorized that the solvent, preferably undecane or its equivalent, first softens the ridges on either side of the scratch trough, and that the heat generated by the buffing action of the buffing pad and polishing grit against the surface of the plastic then works the raised plastic ridges back into the scratch trough, where the same localized heat causes the plastic to reintegrate itself together.

Although this explanation is only a theory, and the mechanism may be more complex, tests have shown that the polishing materials and methods according to the present invention do not strip away appreciable amounts of plastic, while nevertheless being able to eliminate scratches that once penetrated below the plastic surface. The final result is that there is no detectable optical distortion of the plastic object or window being treated.

The polishing compounds according to the present invention comprise solid polishing materials, which preferably comprise one or more of the following insoluble, fine mesh polishing grits: kaolinitic quartz, silicon dioxide (silica), calcined alumina, borosilicate, zirconium dioxide, magnesium oxide, magnesia buffered zinc oxide, or their equivalents. Kaolinitic quartz, zirconium dioxide, magnesium oxide, and magnesia buffered zinc oxide can be obtained from Mitsui Chemical Co. (San Francisco, Calif.); calcined alumina can be obtained from LaRoche Chemicals, Inc. (Baton Rouge, La.); borosilicate can be obtained from Ace Glass (Vineland, N.J.); silicon dioxide can be obtained from Aldrich Chemical Co. (St. Louis, Mo.). The presently preferred embodiments include a mixture of silicon dioxide, calcined alumina, and borosilicate because of their readily availability, although any of the above polishing materials work well. In test samples, for example, kaolinitic quartz was used instead of borosilicate with satisfactory results.

The amount of polishing grit in the present invention is preferably included in concentrations within the range from about 5% to about 40% by weight of the entire mixture, more preferable within the range from about 10% to about 30%, and most preferably within the range from about 15% to about 25%. Mixtures containing relatively equal amounts of calcined alumina, silicon dioxide, and borosilicate have been found to work well for most applications. Nevertheless, the main criterion for a given application is the mesh size of the polishing grit, not its identity.

Indeed, it is often critical for some applications to be able to carefully control the mesh size of the polishing particles according to the needs of a particular application. For example, where a very fine mesh grit is required, such as to treat eyeglasses (where it is preferable for the particle mesh size to be within the range from between about 3 microns to about 5 microns), the utility of the polishing compound might be limited if it were to also contain much larger particles (i.e., particles that were about 10 or 15 microns, or larger), although a small amount of variance can be tolerated. Nevertheless, there may be other applications where having particles of varying sizes is acceptable or even desired.

Experimental Test 1.

Formulas containing polishing grits within certain preselected ranges were tested on various products. It was determined from these tests that polishing formulas having the following particle mesh sizes worked best in initially treating the corresponding plastic objects listed to the right of the range:

TABLE 1

| | |
|---|---|
| 0.5-3 microns | very soft plastics and ultra fine surface finishes |
| 3-5 microns | eyeglasses or compact discs |
| 10-15 microns | convertible top plastic windows |
| 20-30 microns | aircraft windows |
| 40-50 microns | deeper scratches |
| 50-500 microns | heavy duty surface restoration |

Of course, for best results, once the larger scratches were treated, it was preferable to treat the plastic surfaces with polishes having successively smaller particle mesh sizes to completely remove all defects and restore the clarity of the plastic surface to near its original state.

During certain tests where the polishes inadvertently contained small amounts of excessively large particles (500 to 1000 microns), the compounds were unable to completely restore the plastic surface. It is believed that the larger mesh particles caused a small amount of scratching during the buffing process which was barely visible to the naked eye, yet which was able to detectably mar the surface of the plastic.

The excessively large particles probably resulted from initially adding abrasive particles to the polish that were not tested rigorously enough for quality control. In addition, some of the experimental compounds were allowed to sit on the shelf for long periods of time between successive tests and reformulations. During this time, it is possible that some of the particles agglomerated together, perhaps by the action of certain foreign and undesirable solvents which were also inadvertently added to the polish compounds. These superfluous solvents are often contained in technical grade solvents, such as were used in some of the first experimental formulations. Therefore, it is important to use higher grade solvents when formulating the polishing compounds in order to eliminate such unwanted solvents from the resulting mixture.

With regard to the solvents within the present invention, it has been found preferable to use undecane, although any equivalent solvent would work equally well. Undecane is available from Eastman Kodak Chemical Co. In fact, as the examples hereinbelow will show, various experimental formulations contained many different kinds of solvents, some of which may have the same utility, or at least which were able to work together, to aid in the scratch removal process. Other equivalent solvents include, but are not limited to, heptane, octane, nonane, decane, dodecane, tridecane, tetradecane, pentadecane, and other related solvents of similar or equivalent carbon content.

The polishing compositions according to the present invention preferably contain solvents in an amount within the range from between about 3% to about 35% by weight of the overall mixture, depending on whether or not a thicker or thinner formula is desired. Where a thicker formula is desired, less solvents are used, preferably within the range from between about 3% to about 15%, with about 5% to about 12% being more preferable, and 7% to 10% being most preferable. Where a thinner formula is desired, more solvents are used, preferably within the range from between about 18% to about 35%, with about 22% to about 28% being most preferable.

Finally, water is preferably added to the polishing compounds according to the present invention in amounts ranging from between about 35% to about 85%, more preferably between about 45% to about 75%, and most preferably between about 55% to about 66%. In order to obtain a more pure polishing compound, it is preferable to use purified water, which is readily available from many common sources, including any supermarket. One particular source is Nelson Laboratories of Salt Lake City, Utah.

In addition to these essential ingredients, it is sometimes preferable to add a stabilizing agent which helps to keep the polishing compounds mixed together in a suspension. One such material is carnauba wax. Besides acting as a stabilizing agent, it is believed the carnauba wax may also aid the polishing process by providing some level of lubrication. The preferred carnauba wax is Mother's Pure Paste ® (a product of Mother's Pure Paste Co. of Huntington Beach, Calif.) with no cleaners, which is known to be about 22% carnauba. Carnauba wax is preferably included in amounts ranging from about 5% to about 30% by weight, with 10% to 20% being most preferable.

Below are specific examples of compositions and methods which have been created according to the present invention, along with experimental tests showing the development of the product as well as its general utility as a scratch, haze, and discoloration removal compound for plastic surfaces.

EXAMPLE 1

A composition for removing scratches, haze, and discoloration from plastic surfaces (hereinafter the "Thick Formula") was created which had the following components.

| Solid Polishing Material | 26.6% |
|---|---|
| Water | 65.7% |
| Total Solvents | 7.7% |
| (Breakdown of Solvents:) | |
| Undecane | 20% |
| Silicon dioxide | 16.9% |
| Decane | 13.7% |
| Muskolactone | 12.7% |
| Dodecane | 9.8% |
| 1-methyl-4-nitrobenzene | 9.5% |
| Ethanamine | 7.5% |
| 1-methyl-3-nitrobenzene | 5.6% |
| 1-4-Dichlorobenzene | 5.0% |
| 3-Dimethyloctane | 4.9% |
| 2-Methyldecane | 3.5% |
| 4-ethylheptane | 2.0% |
| 5-methyldecane | 1.3% |
| 2,9-dimethyldecane | 1.3% |

The Thick Formula was used in many of the experimental tests set forth below, although its exact formula was not known until it was assayed on May 20, 1992. The polishing solids or abrasive powders in the thick sample were comprised of kaolinitic quartz, silicon dioxide, and calcined alumina, having a mesh size of between about 3 microns to about 100 microns (with a few larger particles as discussed below), although particles having a mesh size of between about 50 microns to about 100 microns were predominant.

As the experimental tests below indicate, the Thick Formula was useful in removing scratches, hazing, and discoloration of a variety of plastic products. Nevertheless, in some cases perfect results were not obtained due to the inclusion among the abrasive solids of unacceptably large particles of between 250 and 1000 microns. It is believed that these larger particles were the result of two independent causes, (1) the initial addition of abrasives that were not completely cleaned of oversized particles, and (2) the agglomeration of the particles over time, as discussed above. That the solvents may have been able to react with at least the silicon dioxide particles is evidenced by the dissolution of significant amounts of silicon dioxide within the solvent phase.

It should be noted that this problem of silicon dioxide dissolution in the organic layer has been remedied by reformulating the polishing compound as set forth in Example 3 below to delete those solvents which are not necessary for the utility of the present invention, and which were only included in the original polishing composition because technical grade solvents were used to prepare the initial experimental formations.

EXAMPLE 2

A composition for removing scratches, haze, and discoloration from plastic surfaces (hereinafter the "Thin Formula") was created which had the following components.

| Solid Polishing Material | 26.4% |
|---|---|
| Water | 54.0% |
| Total Solvents | 19.6% |
| (Breakdown of Solvents:) | |
| Undecane | 12.5% |
| Silicon dioxide | 4.8% |
| Decane | 19.8% |
| 1-ethyl-1-methylbenzene | 5.2% |
| Nonane | 4.8% |
| 4-methyldecane | 4.1% |
| 2-methyldecane | 3.9% |
| 5-methyldecane | 3.8% |
| 1-3,5-trimethylbenzene | 3.6% |
| 2-ethyl-1-decanol | 3.1% |
| 3-methylnonane | 3.0% |
| Dodecane | 2.8% |
| Cyclohexanone | 2.3% |
| Pentacosane | 2.5% |
| 3-methyldecane | 2.7% |
| 3-ethyl-2-ethylheptane | 2.2% |
| 4-ethyl-1,2-dimethylbenzene | 2.3% |
| Other light hydrocarbons | remainder |

The Thin Formula was used in many of the experimental tests set forth below, although its exact formula was not known until it was assayed on May 20, 1992. Like the Thick Formula, the polishing grit or abrasive powders within the Thin Formula comprised kaolinitic quartz, silicon dioxide, and calcined alumina, having a mesh size of between about 3 to about 100 microns (with a few larger particles as discussed below), although particles having a mesh size of between about 3 microns to about 50 microns were predominant.

As the experimental tests below indicate, the Thin Formula was useful in removing scratches, hazing, and discoloration of a variety of plastic products. Nevertheless, in some cases perfect results were not obtained due to the inclusion among the abrasive solids of unacceptably large particles of between 250 and 1000 microns, for the same reasons as those stated with regard to the Thick Formula.

The experiments that follow were carried out by first using the Thick Formula to remove the larger scratches and damage, and then by applying the Thin Formula to remove the smaller scratches and to give the plastic a smoother, cleaner surface.

Experimental Test 2.

The Thick and Thin Formulas were tested on a ten year old Lear 25-D which had been kept for years on the coast of France. Being right on the ocean, the salt water, moisture and other elements had done a great deal of damage to the windows, which were scheduled to be replaced by Learjet at a cost of about $75,000. The Thick Formula with the greater number of larger mesh polishing grit particles (50-100 microns) was applied first, and the Thin Formula with the greater number of smaller mesh polishing grit particles (3-50 microns) was applied subsequently. The Thick and Thin Formulas were able to completely restore the windows to their new, or nearly new, condition. Told about the results, Learjet submitted an additional five windscreens and a cabin window for experimental testing and restoration.

Experimental Test 3.

The Thick and Thin Formulas were tested in the same manner as in Experimental Test 2 on trams and gondolas of five different ski resorts, and succeeded in restoring them to a new, or nearly new, condition.

Experimental Test 4.

The Thick and Thin Formulas were tested in the same manner as in Experimental Test 2 on plastic convertible windows supplied by Mercedes Benz of North America. Before the test, the plastic windows were deliberately scratched and abused with steel wool and Scotch Brite Pads ® until they were almost white. The Thick and Thin Formulas were successful in restoring the windows to their new, or nearly new, condition.

Experimental Test 5.

The Thick and Thin Formulas were tested in the same manner as in Experimental Test 2 on windows in Learjets owned by Global Jet, an international executive jet brokerage/dealer firm located in Atlanta, Ga. Environmental conditions to which these windows were subjected caused a different type of damage than seen on the French Learjet windows. Each window reportedly cost from $10,000 to $22,000 each to replace and required a great amount of care in cleaning and polishing. Again, the experimental tests demonstrated the usefulness of the methods and compositions of the present invention in extending the life of plastic windows.

Experimental Test 6.

The Thick and Thin Formulas were tested in the same manner as in Experimental Test 2 on planes owned by Corporate Wings, Inc., an aircraft dealer/broker that markets turbine powered corporate aircraft, located in Salt Lake City. Once again, these windows were subjected to different environmental conditions than planes from other locales and it was important to test if the methods and compositions of the present invention were nevertheless useful. The windows were made from acrylic plastic and contained serious scratching and hazing, which were remedied by polishing them with the Thick and Thin Formulas.

Experimental Test 7.

The Thick and Thin Formulas were tested in the same manner as in Experimental Test 2 on a variety of antique planes located at the Air Force Museum located near Ogden, Utah. Because these planes are antiques, the windows are constructed from a variety of plastic materials and have been subjected to a variety of environmental conditions. The compositions of the present invention greatly increased the visibility and clarity of each of the windows tested.

The above tests established that the polishing compounds and methods of the present invention work to restore a variety of different plastic surfaces to their original or nearly original finish. However, there were at least two drawbacks to the formulas as they existed during the experimental stage. First, it was discovered that records of the tests were insufficient to provide an exact knowledge of their components or the amounts of each. Related to this problem was the fact that many of the solvents used were of low grade, and often contained contaminants or impurities not essential to the utility of the present invention. Nevertheless, upon assay, these ingredients were found in significant amounts making it unclear which of them were necessary ingredients and which were not.

Second, and equally important, was the inclusion and/or formation of polish grits of greater size than what was necessary or desired. Because the compositions were mixtures of ingredients that the inventor often happened upon, the abrasive powders added to the compounds were not always of the highest quality nor were they adequately classified and segregated according to size. In addition, some agglomeration of the grit particles may have occurred by allowing the compositions to sit for long periods of time between experimental uses. It is possible that some of the extraneous solvents may have aided in this agglomeration process.

Consequently, the polishing compositions of the present invention were reformulated in an attempt to characterize and to exclude all extraneous solvents, and to only include mesh size abrasive powders within a narrow desired range.

EXAMPLE 3

A composition for removing scratches, haze, and discoloration from plastic surfaces was created which had the following components:

| Total Solid Polishing Material | 16% |
| --- | --- |
| (Calcined Alumina (5 microns) 5%) | |
| (Silicon Dioxide (3.9 microns) 5%) | |
| (Borosilicate (10-20 microns) 5%) | |
| Water | 62% |
| Undecane | 7% |
| Pure Carnauba Wax | 15% |

This new formulation was tested on a variety of plastic surfaces and found to remove scratches, hazing, discoloration, and other imperfections, yielding results that were equal to or better than those that were previously obtained using the formulations of Experimental Tests 1-7. However, there was no incidental scratching due to larger, unwanted mesh size particles (which were excluded), as in the prior formulations.

While the following examples are hypothetical in nature, they are based upon similar mix designs which have either been made, or calculated and extrapolated from actual mixes. However, these examples are presented this way in order to more specifically teach those skilled in the art the compositions and methods of the present invention.

EXAMPLES 4-9

The compositions of these examples are identical to that of Example 3, except that polishing grits within varying ranges of mesh size are added to each. In each example, the compositions and amounts of the different materials within the polishing grit are the same as in Example 3.

| Example | Polishing Grit Mesh Size (microns) |
|---|---|
| 4 | 0.5-3 |
| 5 | 3-5 |
| 6 | 10-15 |
| 7 | 20-30 |
| 8 | 40-50 |
| 9 | 50-500 |

These compositions are able to remove different size scratches and other imperfections from a variety of plastic surfaces in relation to the mesh size of the polishing grit within each. For example, those compositions with finer polishing grits work best for removing smaller scratches and imperfections, while those with coarser polishing grits work best for removing larger scratches and imperfections. In addition, in order to restore the surface of the plastic to its finest possible finish, it is preferable to treat the plastic surface with a series of compositions that have progressively smaller polishing grits in those cases where compositions having larger grit sizes were initially used.

EXAMPLES 10-17

The compositions of these examples are identical to that of Example 3, except that instead of undecane, a variety of solvents similar to undecane are employed. In all other respects the composition and amounts of the different materials are the same as in Example 3. In particular, these other solvents are included in concentrations of about 7% by weight of the total composition.

| Example | Solvent |
|---|---|
| 10 | heptane |
| 11 | octane |
| 12 | nonane |
| 13 | decane |
| 14 | dodecane |
| 15 | tridecane |
| 16 | tetradecane |
| 17 | pentadecane |

These compositions are able to remove scratches and other imperfections from a variety of plastic surfaces with equal efficacy as the composition in Example 3, except that the compositions of each have slightly different tendencies to lose solvent to evaporation as they are being used due to the difference in volatilities of the different solvents. In some instances it may be preferable to use a composition that loses solvent slightly more rapidly, and at other times, one that loses solvent slightly less rapidly. For example, such may be the case depending on the temperature during which the compositions are being used. In other cases, the type of plastic may dictate this variable.

EXAMPLES 18-21

The compositions in these examples are similar to the composition of Example 3, except that amounts of polishing grit and water are different. They all contain the same percentage of solvent and carnauba wax.

| Example | Polishing grit | Water |
|---|---|---|
| 18 | 5% | 73% |
| 19 | 10% | 68% |
| 20 | 25% | 53% |
| 21 | 30% | 48% |

These compositions are able to remove scratches and other imperfections from plastic surfaces like the compound in Example 3, except that those containing less polishing grit take longer, but result in a slightly clearer surface. Conversely, those compounds having more polishing grit are better suited for quicker polishing jobs, but result in a slightly less clear finish.

EXAMPLES 22-24

The compositions in these examples are similar to the composition in Example 3, except that the water content is altered, with all other ingredients being proportionally adjusted to make up the difference.

| Example | Water |
|---|---|
| 22 | 35% |
| 23 | 45% |
| 24 | 85% |

The compositions having a lower water content (and therefore proportionately higher polishing grit and solvent contents) are able to clean the plastic surface more quickly than the composition of Example 3, while the composition having a higher water content is slower.

EXAMPLES 25-30

The compositions in these examples are similar to the composition of example 3, except that they contain different amounts of carnauba wax, with all other ingredients being proportionately altered to make up the difference.

| Example | Carnauba Wax |
|---|---|
| 25 | 0% |
| 26 | 5% |
| 27 | 10% |
| 28 | 20% |
| 29 | 25% |
| 30 | 30% |

The compositions of these examples are able to clean scratches and imperfections similar to the composition of Example 3, except that those that contain no carnauba wax, or only a little, tend to separate into their organic and aqueous phases more readily, requiring more intermittent mixing while being used during a given project. However, even the smallest amounts of carnauba wax greatly increase the tendency of the mixtures to remain in suspension. Compositions that contain larger amounts of wax remain suspended over longer periods of time, but require longer buffing time due to the increase in lubricating ability of the wax.

EXAMPLES 31-38

The compositions of these examples are similar to the composition of Example 3, except that the amounts of solvent are varied, with all other ingredients being proportionately adjusted to make up the difference.

| Example | Solvent |
| --- | --- |
| 31 | 3% |
| 32 | 5% |
| 33 | 10% |
| 34 | 15 |
| 35 | 20% |
| 36 | 25% |
| 37 | 30% |
| 38 | 35% |

These compositions are able to remove scratches and other imperfections from plastic surfaces like the composition of Example 3, except that those compositions containing less solvent are less able to soften the plastic surface during the polishing process, while those that contain larger amounts of solvent tend to soften the plastic surface more. Plastics which are harder or otherwise more resistant to action by solvents may require the addition of more plastic softening solvent, while softer plastics may require less.

EXAMPLES 39-42

The compositions of these examples are similar to the composition of Example 3, except that instead of borosilicate, these examples include the following solid polishing materials in amounts of about 5%.

| Example | Solid Polishing Material |
| --- | --- |
| 39 | kaolinitic quartz |
| 40 | zirconium dioxide |
| 41 | magnesium oxide |
| 42 | magnesia buffered zinc oxide |

EXAMPLES 43-46

Some or all of the compounds of Examples 4-9 are applied to plastic surfaces having scratches or imperfections of varying intensity. In general, compounds which have larger mesh size polishing grit particles are applied first, while compounds with progressively smaller mesh size polishing grit particles are applied in succession to give the plastic the clearest surface possible. Between each step the polishing material remaining on the plastic surface is completely removed before applying the subsequent polishing compound. The polishing compounds are applied using clean buffing pads in each step.

| Example | Imperfection | Compounds Applied in Order |
| --- | --- | --- |
| 43 | deep scratch | Examples 9, 7, 5, 4 |
| 44 | moderate scratch | Examples 8, 6, 4 |
| 45 | minor scratch | Examples 5, 4 |
| 46 | surface hazing | Example 4 |

The methods and compositions of these examples are able to restore the plastic surfaces to a nearly perfect condition. Only an insubstantial amount of plastic is removed in the case of the deep scratch in Example 42, and virtually none in the case of the surface hazing in Example 45.

This invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A composition for removing scratches and other imperfections from plastic surfaces comprising
    a solid polishing material in an amount within a range from between about 5% to about 40% by weight of said composition;
    water in an amount within a range from about 35% to about 85% by weight; and
    organic solvent in an amount within a range from about 3% to about 35% by weight, said organic solvent comprising at least one alkane.

2. A composition for removing scratches and other imperfections from plastic surfaces as defined in claim 1, wherein said solid polishing material is included in an amount in the range from between about 10% to about 30% by weight.

3. A composition for removing scratches and other imperfections from plastic surfaces as defined in claim 1, wherein said solid polishing material is included in an amount in the range from between about 15% to about 25% by weight.

4. A composition for removing scratches and other imperfections from plastic surfaces as defined in claim 1, wherein said water is included in an amount in the range from between about 45% to about 75% by weight.

5. A composition for removing scratches and other imperfections from plastic surfaces as defined in claim 1, wherein said water is included in an amount in the range from between about 55% to about 65% by weight.

6. A composition for removing scratches and other imperfections from plastic surfaces as defined in claim 1, wherein said organic solvent is included in an amount in the range from about 3% to about 15%.

7. A composition for removing scratches and other imperfections from plastic surfaces as defined in claim 6, wherein said organic solvent is included in an amount in the range from about 5% to about 12%.

8. A composition for removing scratches and other imperfections from plastic surfaces as defined in claim 7, wherein said organic solvent is included in an amount in the range from about 7% to about 10%.

9. A composition for removing scratches and other imperfections from plastic surfaces as defined in claim 1, wherein said organic solvent is included in an amount in the range from about 18% to about 35%.

10. A composition for removing scratches and other imperfections from plastic surfaces as defined in claim 9, wherein said organic solvent is included in an amount in the range from about 22% to about 28%.

11. A composition for removing scratches and other imperfections from plastic surfaces as defined in claim 1, further comprising a stabilizing agent to aid in keeping individual components mixed together, said stabilizing agent being included in an amount in a range from about 5% to about 30% by weight.

12. A composition for removing scratches and other imperfections from plastic surfaces as defined in claim 11, wherein said stabilizing agent comprises carnauba wax.

13. A composition for removing scratches and other imperfections from plastic surfaces as defined in claim 12, wherein said carnauba wax is included in an amount within the range from about 10% to about 20% by weight.

14. A composition for removing scratches and other imperfections from plastic surfaces as defined in claim 1, wherein said solid polishing material comprises at least one material selected from the group consisting of kaolinitic quartz, silicon dioxide, calcined alumina, borosilicate, zirconium dioxide, magnesium oxide, and magnesia buffered zinc oxide.

15. A composition for removing scratches and other imperfections from plastic surfaces as defined in claim 1, wherein said solid polishing material comprises a fine mesh powder consisting essentially of borosilicate, silicon dioxide and calcined alumina,
said borosilicate is included in an amount in a range from about 3% to about 15% by weight,
said silicon dioxide is included in an amount in a range from about 3% to about 15% by weight, and
said calcined alumina is included in an amount in a range from about 3% to about 15% by weight.

16. A composition for removing scratches and other imperfections from plastic surfaces as defined in claim 15, wherein said borosilicate is included in an amount of about 5% by weight, said silicon dioxide is included in an amount of about 5% by weight, and said calcined alumina is included in an amount of about 5% by weight.

17. A composition for removing scratches and other imperfections from plastic surfaces as defined in claim 1, wherein said solid polishing material has a particle mesh size within a range from about 0.5 microns to about 500 microns.

18. A composition for removing scratches and other imperfections from plastic surfaces as defined in claim 17, wherein said solid polishing material has a particle mesh size within the range from about 0.5 microns to about 3 microns.

19. A composition for removing scratches and other imperfections from plastic surfaces as defined in claim 17, wherein said solid polishing material has a mesh size within the range from about 3 microns to about 10 microns.

20. A composition for removing scratches and other imperfections from plastic surfaces as defined in claim 17, wherein said solid polishing material has a mesh size within the range from about 10 microns to about 20 microns.

21. A composition for removing scratches and other imperfections from plastic surfaces as defined in claim 17, wherein said solid polishing material has a mesh size within the range from about 20 microns to about 30 microns.

22. A composition for removing scratches and other imperfections from plastic surfaces as defined in claim 17, wherein said solid polishing material has a mesh size within the range from about 30 microns to about 50 microns.

23. A composition for removing scratches and other imperfections from plastic surfaces as defined in claim 17, wherein said solid polishing material has a mesh size within the range from about 50 microns to about 500 microns.

24. A composition for removing scratches and other imperfections from plastic surfaces as defined in claim 1, wherein said organic solvent consists essentially of undecane, decane, muskolactone, dodecane, 1-methyl-4-nitrobenzene, ethanamine, 1-methyl-3-nitrobenzene, 1,4-dichlorobenzene, 3,3-dimethyloctane, 2-methylundecane, 4-ethylheptane, 5-methylundecane, and 2,9-dimethyldecane.

25. A composition for removing scratches and other imperfections from plastic surfaces as defined in claim 1, wherein said organic solvent consists essentially of decane, undecane, 1-ethyl-1-methylbenzene, nonane, 4-methyldecane, 2-methyldecane, 5-methyldecane, 1,3,5-trimethylbenzene, 2-ethyl-1-decanol, 3-methylnonane, dodecane, cyclohexanone, pentacosane, 3-methyldecane, 3-ethyl-2-ethylheptane, and 4-ethyl-1,2-dimethylbenzene.

26. A composition for removing scratches and other imperfections from plastic surfaces as defined in claim 1, wherein said organic solvent comprises at least one solvent selected from the group consisting of heptane, octane, nonane, decane, undecane, dodecane, tridecane, tetradecane, and pentadecane.

27. A composition for removing scratches and other imperfections from plastic surfaces as defined in claim 1, wherein said solid polishing material comprises a fine mesh powder consisting essentially of kaolinitic quartz, silicon dioxide and calcined alumina,
said kaolinitic quartz is included in an amount in a range from about 3% to about 15% by weight,
said silicon dioxide is included in an amount in a range from about 3% to about 15% by weight, and
said calcined alumina is included in an amount in a range from about 3% to about 15% by weight.

28. A composition for removing scratches and other imperfections from plastic surfaces comprising
a solid polishing material having a concentration within a range from between about 15% to about 25% by weight, a polishing grit within said polishing material having a mesh size in a range from about 0.5 microns to about 500 microns and comprising kaolinitic quartz, silicon dioxide and calcined alumina;
water having a concentration within a range from 55% to 65% by weight; and
an organic solvent ranging in concentration from about 5% to about 15% by weight, said organic solvent comprising at least one alkane selected from the group consisting of heptane, octane, nonane, decane, undecane, dodecane, tridecane, tetradecane, and pentadecane.

29. A composition for removing scratches and other imperfections from plastic surfaces according to claim 28, wherein said organic solvent is undecane.

30. A method for removing scratches and other imperfections from plastic surfaces comprising the steps of
applying to a buffing pad a polishing composition comprising
a solid polishing material in a concentration within a range from between about 5% to about 40% by weight, and a particle size in a range from between about 0.5 microns to about 500 microns;
water in a concentration within a range from about 35% to about 85%; and
an organic solvent in a concentration within a range from about 3% to about 30%, said solvent comprising at least one alkane; and
using said buffing pad and said polishing composition to buff a plastic surface to remove said scratches and other imperfections.

31. A method for removing scratches and other imperfections from plastic surfaces as defined in claim 30, wherein said buffing pad comprises an open-cell polyurethane material.

32. A method for removing scratches and other imperfections from plastic surfaces as defined in claim 30, wherein said buffing pad comprises fleece wool, linen, cotton or a combination thereof.

33. A method for removing scratches and other imperfections from plastic surfaces as defined in claim 30, wherein the process of using said buffing pad and said polishing composition to buff said plastic surface comprises multiple steps, the multiple steps comprising a first step which includes using a first polishing composition comprising polishing grit particles having a larger mesh size compared to polishing grit particles within a second polishing composition used in a second step; and a second step which includes using said second polishing composition comprising polishing grit particles having a smaller mesh size compared to said polishing grit particles within said first polishing composition used in said first step.

34. A method for removing scratches and other imperfections from plastic surfaces as defined in claim 30, wherein the polishing composition is applied to the plastic surface with a rotary buffing machine.

35. A method for removing scratches and other imperfections from plastic surfaces as defined in claim 30, wherein the polishing composition is applied to the plastic surface with a robotic polishing machine.

36. A method for removing scratches and other imperfections from plastic surfaces as defined in claim 30, wherein the polishing composition is applied to the plastic surface with an orbital polishing machine.

37. A method for removing scratches and other imperfections from plastic surfaces as defined in claim 30, wherein the polishing composition is applied to the plastic surface with an oscillating polishing machine.

38. A method for removing scratches and other imperfections from plastic surfaces as defined in claim 30, wherein said solid polishing material comprises at least one material selected from the group consisting of kaolinitic quartz, silicon dioxide, calcined alumina, borosilicate, zirconium dioxide, magnesium oxide, and magnesia buffered zinc oxide.

39. A method for removing scratches and other imperfections from plastic surfaces as defined in claim 30, wherein said solid polishing material comprises kaolinitic quartz, silicon dioxide, and calcined alumina.

40. A method for removing scratches and other imperfections from plastic surfaces as defined in claim 30, wherein said organic solvent comprises undecane.

* * * * *

UNITED STATES PATENT AND TRADEMARK OFFICE
CERTIFICATE OF CORRECTION

PATENT NO.  :  5,334,335
DATED       :  August 2, 1994
INVENTOR(S) :  WILLIAM C. NORVILLE It is certified that error appears in the above-indentified patent and that said Letters Patent is hereby corrected as shown below:

Column 5, line 28, "nofiane" should be —nonane—
Column 7, line 35, "readily" should be —ready—
Column 7, line 43, "preferable" should be —preferably—
Column 15, line 6, "15" should be —15%—

Signed and Sealed this

Thirty-first Day of January, 1995

Attest:

BRUCE LEHMAN

*Attesting Officer*     *Commissioner of Patents and Trademarks*